United States Patent

Senzaki

(10) Patent No.: US 10,997,695 B2
(45) Date of Patent: May 4, 2021

(54) IMAGE PROCESSING DEVICE, IMAGE PROCESSING METHOD, AND RECORDING MEDIUM

(71) Applicant: NEC Corporation, Tokyo (JP)

(72) Inventor: Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 277 days.

(21) Appl. No.: 16/082,067

(22) PCT Filed: Mar. 3, 2017

(86) PCT No.: PCT/JP2017/008436
§ 371 (c)(1),
(2) Date: Sep. 4, 2018

(87) PCT Pub. No.: WO2017/154762
PCT Pub. Date: Sep. 14, 2017

(65) Prior Publication Data
US 2020/0311875 A1    Oct. 1, 2020

(30) Foreign Application Priority Data
Mar. 10, 2016    (JP) ............................ JP2016-046550

(51) Int. Cl.
*G06T 5/00*    (2006.01)
*G06T 5/10*    (2006.01)

(52) U.S. Cl.
CPC ............... *G06T 5/002* (2013.01); *G06T 5/10* (2013.01); *G06T 2207/20182* (2013.01)

(58) Field of Classification Search
None
See application file for complete search history.

(56) References Cited

U.S. PATENT DOCUMENTS

2011/0228841 A1*  9/2011  Suzuki ............... H04N 19/117
                                            375/240.03
2015/0085943 A1*  3/2015  Taniguchi .......... H04N 5/145
                                            375/240.29
2016/0132996 A1*  5/2016  Tsukioka ............ G06T 5/00
                                            382/190

FOREIGN PATENT DOCUMENTS

JP    2009094751 A    4/2009
JP    2013240039 A    11/2013
(Continued)

OTHER PUBLICATIONS

Van Roosmalen, Peter MB, Reginald L. Lagendijk, and Jan Biemond. "Embedded coring in MPEG video compression." IEEE Transactions on Circuits and Systems for Video Technology 12.3 (2002): 205-211. (Year: 2002).*

(Continued)

*Primary Examiner* — Vu Le
*Assistant Examiner* — Tracy Mangialaschi

(57) ABSTRACT

The present invention suppresses noise that is possibly generated due to threshold processing during frequency conversion. The image processing device 100 includes: a threshold processing unit 110 for executing threshold processing, by using a first parameter for conversion coefficients of respective frequency components that are obtained by frequency conversion of a block consisting of multiple pixels; a calculation unit 120 for calculating feature quantities of the constituent multiple pixels of the block; a determination unit 130 for determining a second parameter on the basis of the calculated feature quantities; and a correction unit 140 for correcting, by using the determined second parameter, the threshold-processed conversion coefficients of the respective frequency components.

6 Claims, 11 Drawing Sheets

(56) References Cited

FOREIGN PATENT DOCUMENTS

JP          2015012318 A      1/2015
WO       2010041534 A1      4/2010

OTHER PUBLICATIONS

Chen, Yi, et al. "Removing noise using block dct in magnetic resonance images." Proceedings of 2011 International Conference on Computer Science and Network Technology. vol. 2. IEEE, 2011. (Year: 2011).*

Komatsu, T., et al., "Super-Resolution Decoding of JPEG-Compressed Image Data With the Shrinkage in the Redundant DCT Domain," 28th Picture Coding Symposium (PCS), 2010, pp. 114-117.

Written Opinion, dated May 16, 2017 from the International Bureau in counterpart International application No. PCT/JP2017/008436.

International Search Report, dated May 16, 2017 from the International Bureau in counterpart International application No. PCT/JP2017/008436.

* cited by examiner

Fig.5

|  | B1 |  |  |  |  |  |  |  | B2 |
|---|---|---|---|---|---|---|---|---|---|
| $P_{11}$ | $P_{12}$ | $P_{13}$ | $P_{14}$ | $P_{15}$ | $P_{16}$ | $P_{17}$ | $P_{18}$ | $P_{19}$ |
| $P_{21}$ | $P_{22}$ | $P_{23}$ | $P_{24}$ | $P_{25}$ | $P_{26}$ | $P_{27}$ | $P_{28}$ | $P_{29}$ |
| $P_{31}$ | $P_{32}$ | $P_{33}$ | $P_{34}$ | $P_{35}$ | $P_{36}$ | $P_{37}$ | $P_{38}$ | $P_{39}$ |
| $P_{41}$ | $P_{42}$ | $P_{43}$ | $P_{44}$ | $P_{45}$ | $P_{46}$ | $P_{47}$ | $P_{48}$ | $P_{49}$ |
| $P_{51}$ | $P_{52}$ | $P_{53}$ | $P_{54}$ | $P_{55}$ | $P_{56}$ | $P_{57}$ | $P_{58}$ | $P_{59}$ |
| $P_{61}$ | $P_{62}$ | $P_{63}$ | $P_{64}$ | $P_{65}$ | $P_{66}$ | $P_{67}$ | $P_{68}$ | $P_{69}$ |
| $P_{71}$ | $P_{72}$ | $P_{73}$ | $P_{74}$ | $P_{75}$ | $P_{76}$ | $P_{77}$ | $P_{78}$ | $P_{79}$ |
| $P_{81}$ | $P_{82}$ | $P_{83}$ | $P_{84}$ | $P_{85}$ | $P_{86}$ | $P_{87}$ | $P_{88}$ | $P_{89}$ |
| $P_{91}$ | $P_{92}$ | $P_{93}$ | $P_{94}$ | $P_{95}$ | $P_{96}$ | $P_{97}$ | $P_{98}$ | $P_{99}$ |

| z | 0 | 0.01 | 0.02 | 0.03 | 0.04 | 0.05 | 0.06 | 0.07 | 0.08 | 0.09 |
|---|---|---|---|---|---|---|---|---|---|---|
| 0 | 0 | 0.004 | 0.008 | 0.012 | 0.016 | 0.0199 | 0.0239 | 0.0279 | 0.0319 | 0.0359 |
| 0.1 | 0.0398 | 0.0438 | 0.0478 | 0.0517 | 0.0557 | 0.0596 | 0.0636 | 0.0675 | 0.0714 | 0.0753 |
| 0.2 | 0.0793 | 0.0832 | 0.0871 | 0.091 | 0.0948 | 0.0987 | 0.1026 | 0.1064 | 0.1103 | 0.1141 |
| 0.3 | 0.1179 | 0.1217 | 0.1255 | 0.1293 | 0.1331 | 0.1368 | 0.1406 | 0.1443 | 0.148 | 0.1517 |
| 0.4 | 0.1554 | 0.1591 | 0.1628 | 0.1664 | 0.17 | 0.1736 | 0.1772 | 0.1808 | 0.1844 | 0.1879 |
| 0.5 | 0.1915 | 0.195 | 0.1985 | 0.2019 | 0.2054 | 0.2088 | 0.2123 | 0.2157 | 0.219 | 0.2224 |
| 0.6 | 0.2257 | 0.2291 | 0.2324 | 0.2357 | 0.2389 | 0.2422 | 0.2454 | 0.2486 | 0.2517 | 0.2549 |
| 0.7 | 0.258 | 0.2611 | 0.2642 | 0.2673 | 0.2704 | 0.2734 | 0.2764 | 0.2794 | 0.2823 | 0.2852 |
| 0.8 | 0.2881 | 0.291 | 0.2939 | 0.2967 | 0.2995 | 0.3023 | 0.3051 | 0.3078 | 0.3106 | 0.3133 |
| 0.9 | 0.3159 | 0.3186 | 0.3212 | 0.3238 | 0.3264 | 0.3289 | 0.3315 | 0.334 | 0.3365 | 0.3389 |
| 1 | 0.3413 | 0.3438 | 0.3461 | 0.3485 | 0.3508 | 0.3531 | 0.3554 | 0.3577 | 0.3599 | 0.3621 |
| 1.1 | 0.3643 | 0.3665 | 0.3686 | 0.3708 | 0.3729 | 0.3749 | 0.377 | 0.379 | 0.381 | 0.383 |
| 1.2 | 0.3849 | 0.3869 | 0.3888 | 0.3907 | 0.3925 | 0.3944 | 0.3962 | 0.398 | 0.3997 | 0.4015 |
| 1.3 | 0.4032 | 0.4049 | 0.4066 | 0.4082 | 0.4099 | 0.4115 | 0.4131 | 0.4147 | 0.4162 | 0.4177 |
| 1.4 | 0.4192 | 0.4207 | 0.4222 | 0.4236 | 0.4251 | 0.4265 | 0.4279 | 0.4292 | 0.4306 | 0.4319 |
| 1.5 | 0.4332 | 0.4345 | 0.4357 | 0.437 | 0.4382 | 0.4394 | 0.4406 | 0.4418 | 0.4429 | 0.4441 |
| 1.6 | 0.4452 | 0.4463 | 0.4474 | 0.4484 | 0.4495 | 0.4505 | 0.4515 | 0.4525 | 0.4535 | 0.4545 |
| 1.7 | 0.4554 | 0.4564 | 0.4573 | 0.4582 | 0.4591 | 0.4599 | 0.4608 | 0.4616 | 0.4625 | 0.4633 |
| 1.8 | 0.4641 | 0.4649 | 0.4656 | 0.4664 | 0.4671 | 0.4678 | 0.4686 | 0.4693 | 0.4699 | 0.4706 |
| 1.9 | 0.4713 | 0.4719 | 0.4726 | 0.4732 | 0.4738 | 0.4744 | 0.475 | 0.4756 | 0.4761 | 0.4767 |
| 2 | 0.4772 | 0.4778 | 0.4783 | 0.4788 | 0.4793 | 0.4798 | 0.4803 | 0.4808 | 0.4812 | 0.4817 |

IMAGE PROCESSING DEVICE, IMAGE PROCESSING METHOD, AND RECORDING MEDIUM

This application is a National Stage Entry of PCT/JP2017/008436 filed on Mar. 3, 2017, which claims priority from Japanese Patent Application 2016-046550 filed on Mar. 10, 2016, the contents of all of which are incorporated herein by reference, in their entirety.

TECHNICAL FIELD

The present disclosure relates to image processing.

BACKGROUND ART

It is necessary to reduce noise contained in an image for reproducing an image more crisply as well as for suppressing emphasis of noise caused by image processing. The noise includes, for example, the additive white Gaussian noise or Poisson noise.

There are techniques to reduce noise contained in an image. One example of the techniques is the Redundant Discrete Cosine Transform or Redundant DCT, hereinafter also referred to as the RDCT, which is a type of the Discrete Cosine Transform, hereinafter also referred to as the DCT (refer to NPL 1, for example). The RDCT obtains an image with less noise by correcting a conversion coefficient (amplitude) obtained through the DCT on each block by using Soft Shrinkage or Hard Shrinkage and executing inverse conversion of the corrected conversion coefficient.

Assuming that noise contained in an input image is additive white Gaussian noise having a mean 0 and a variance $\sigma^2$, components of the noise component diffuse to all conversion coefficients that have undergone the DCT processing. On the other hand, according to the sparse representation theory for image signals, energy generally tends to concentrate on a particular frequency component of a noise-free image signal after the DCT processing. Accordingly, a noise-free image signal may be represented by a relatively small number of conversion coefficients. Based on this property, it is possible to maintain the components of an original signal while reducing a noise component by executing threshold processing that rejects a conversion coefficient having a small absolute value and that maintains a conversion coefficient having a large absolute value. Note that frequency conversion techniques used for noise reduction may include the DCT as well as the Hadamard transform and the wavelet transform.

CITATION LIST

Non Patent Literature

NPL 1 TAKASHI KOMATSU, YASUTAKA UEDA, TAKAHIRO SAITO.: "Super-resolution decoding of JPEG-compressed image data with the shrinkage in the redundant DCT domain," Picture Coding Symposium (PCS), 2010, pp.114-117, 8-10 Dec. 2010.

SUMMARY OF INVENTION

Technical Problem

In a flat region of an image, that is, in a region where pixel values have no or little difference, when some of the frequency components remain without turning to 0 while a majority of the frequency components turn to 0 in the aforementioned threshold processing, the corresponding frequency base pattern may appear in an image. This base pattern may be visually recognized as a pattern that is originally nonexistent in a flat region. In particular, this problem becomes notable when a block size becomes larger.

An example object of the disclosure is to suppress noise that is possibly generated due to threshold processing during frequency conversion.

Solution to Problem

An aspect of the disclosure is an image processing device. The image processing device includes threshold processing means for executing threshold processing, by using a first parameter, on a conversion coefficient of a frequency component that is obtained by frequency conversion of a block consisting of a plurality of pixels, calculation means for calculating a feature quantity of the plurality of pixels constituting the block, determination means for determining a second parameter, based on the calculated feature quantity, and correction means for correcting, by using the determined second parameter, the threshold-processed conversion coefficient of the frequency component.

Another aspect of the disclosure is an image processing device. The image processing device includes division means for dividing an image into blocks consisting of a plurality of pixels, conversion means for calculating a conversion coefficient of a frequency component that is obtained by frequency conversion of the blocks, threshold processing means for executing threshold processing, by using a first parameter, on the conversion coefficient that is calculated on a per block basis, calculation means for calculating a feature quantity of the plurality of pixels constituting each of the blocks on a per block basis, determination means for determining a second parameter on a per block basis, based on the calculated feature quantity, correction means for correcting, by using the determined second parameter, the threshold-processed conversion coefficient of the frequency component on a per block basis, inverse conversion means for generating corrected blocks corresponding to the blocks through inverse conversion of the frequency converted by using the corrected conversion coefficient of the frequency component, integration means for generating image data integrating the generated blocks, and normalization means for normalizing the generated image data.

Another aspect of the disclosure is an image processing method. The image processing method executes threshold processing, by using a first parameter, on a conversion coefficient of a frequency component that is obtained by frequency conversion of a block consisting of a plurality of pixels, calculating a feature quantity of the plurality of pixels constituting the block, determining a second parameter, based on the calculated feature quantity, and correcting, by using the determined second parameter, the threshold-processed conversion coefficient of the frequency component.

Another aspect of the disclosure is a program recording medium. The program recording medium stores, in a computer-readable way, a program for executing on a computer, processing to execute threshold processing, by using a first parameter, on a conversion coefficient of a frequency component that is obtained by frequency conversion of a block consisting of a plurality of pixels, processing to calculate a feature quantity of the plurality of pixels constituting the block, processing to determine a second parameter, based on the calculated feature quantity, and processing to correct, by using the determined second parameter, the threshold-processed conversion coefficient of the frequency component.

Advantageous Effects of Invention

According to the disclosure, it is possible to suppress noise that is possibly generated due to threshold processing during frequency conversion.

BRIEF DESCRIPTION OF DRAWINGS

FIG. 5 illustrates division of image data.

FIG. 8A illustrates a table of standard normal distribution.

DESCRIPTION OF EMBODIMENTS

First Example Embodiment

Figure 1:
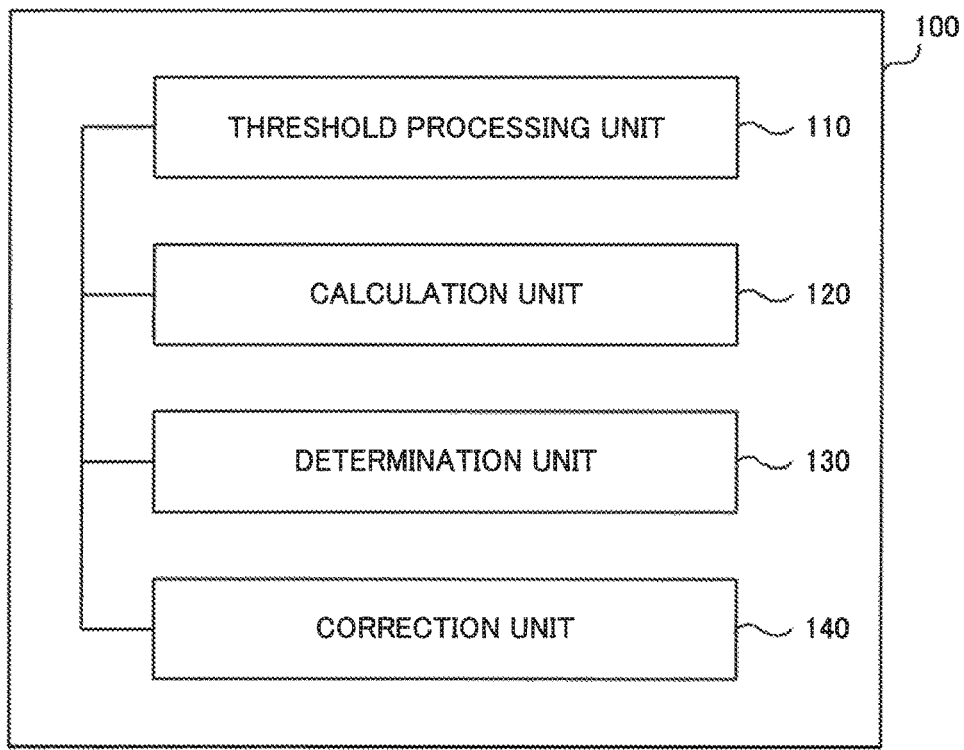
FIG. 1 is a block diagram illustrating an example configuration of an image processing device.

FIG. 1 is a block diagram illustrating a configuration of an image processing device 100 according to a first example embodiment. The image processing device 100 includes a threshold processing unit 110, a calculation unit 120, a determination unit 130, and a correction unit 140. The image processing device 100 may include, as appropriate, another component.

The image processing device 100 is designed to suppress noise that is possibly generated due to threshold processing during frequency conversion. The word frequency conversion used herein refers to processing for converting, into a frequency domain, a set of pixels obtained when an image is divided into a predetermined size, which set is hereinafter referred to as a block. Frequency conversion is, by way of example but not limited thereto, any one of the DCT, the RDCT, the Fourier transform, the Hadamard transform and the wavelet transform.

A block size or a block shape is not particularly limited. Note that the block shape is assumed as a square for the purpose of explanation in the following description. It is assumed that a side of the square is in the horizontal or vertical direction. In other words, a block according to the example embodiment consists of a same number of pixels arranged in the horizontal or vertical direction. The block size is, for example, 8×8 (namely 64) pixels or 16×16 (namely 256) pixels.

The threshold processing unit 110 executes threshold processing. Regarding the threshold processing unit 110, a specific method for threshold processing is not limited as long as it is possible to reject a conversion coefficient having a small absolute value and maintain a conversion coefficient having a large absolute value. The threshold processing unit 110 may execute the aforementioned Hard Shrinkage or Soft Shrinkage, or another threshold processing.

Specifically, the threshold processing unit 110 executes threshold processing, by using a predetermined parameter, on a conversion coefficient of a frequency component that is obtained by frequency conversion of a block. This parameter is hereinafter referred to as a "first parameter". For example, the threshold processing unit 110 compares an absolute value of a conversion coefficient of a frequency component with a first parameter and rejects, or sets to 0, a conversion coefficient having an absolute value equal to or smaller than the first parameter, and does not reject a conversion coefficient having an absolute value larger than the first parameter. The threshold processing unit 110 may leave unchanged the value of a conversion coefficient having an absolute value larger than the first parameter or change the value of the conversion coefficient to a value closer to 0 than the original value.

The calculation unit 120 calculates a feature quantity of a block. The calculation unit 120 calculates a feature quantity regarding a plurality of pixels constituting a block. In other words, the feature quantity calculated by the calculation unit 120 depends on pixels constituting a block and may differ depending on pixels constituting a block. In the first example embodiment, a feature quantity is specified by a distribution of pixels constituting a block. For example, a feature quantity is specified based on a variance or a standard deviation of pixel values.

The determination unit 130 determines a parameter for correcting a conversion coefficient. This parameter is hereinafter referred to as a "second parameter". The determination unit 130 determines a second parameter, based on the feature quantity calculated by the calculation unit 120. The second parameter is determined, for example, in such a way that a conversion coefficient is rejected when a predetermined condition is satisfied and that the conversion coefficient is maintained when the predetermined condition is not satisfied.

The correction unit 140 corrects a conversion coefficient. The correction unit 140 corrects the conversion coefficient of the frequency component threshold-processed by the threshold processing unit 110, by using the second parameter determined by the determination unit 130. The correction unit 140 outputs the corrected conversion coefficient.

Figure 2:
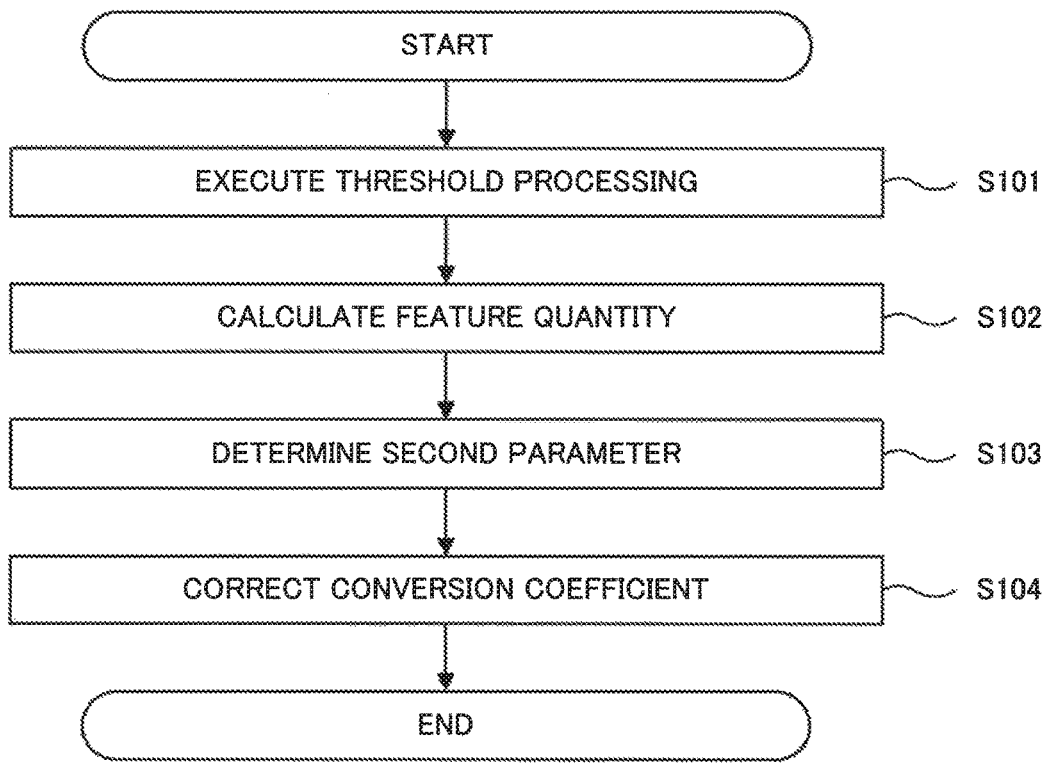
FIG. 2 is a flowchart illustrating an operation of the image processing device.

FIG. 2 is a flowchart illustrating an operation of the image processing device 100. The image processing device 100 executes processing illustrated in FIG. 2 on a per block basis. In other words, when a plurality of blocks are to be processed, the image processing device 100 executes the processing illustrated in FIG. 2 on each of the plurality of blocks.

In step S101, the threshold processing unit 110 executes threshold processing, by using the first parameter, on a conversion coefficient of a frequency component that is obtained by frequency resolution of a block to be processed. On this occasion, the threshold processing unit 110 obtains the conversion coefficient of the frequency component. Processing to calculate a conversion coefficient from a pixel value in a block may be executed by a device different from the image processing device 100 or by another component arranged in a preceding stage of the threshold processing unit 110.

In step S102, the calculation unit 120 calculates a feature quantity of a block to be processed. A timing with which the processing in step S102 is executed does not depend on a timing with which the processing in step S101 is executed. The calculation unit 120 may calculate a feature quantity in parallel with the threshold processing by the threshold processing unit 110 or before the threshold processing starts.

In step S103, the determination unit 130 determines a second parameter, based on the feature quantity calculated in step S102. In other words, the determination unit 130 determines whether or not to correct a block to be processed, based on the feature quantity calculated in step S102. Note that the second parameter is applied uniformly to the conversion coefficients of all frequency components except a DC component.

In step S104, the correction unit 140 corrects the conversion coefficient threshold-processed in step S101, by using the second parameter. For example, the correction unit 140 multiplies a conversion coefficient of a frequency component by the second parameter. In this example, when the second parameter value is 0, the correction unit 140 sets to 0 the conversion coefficients of all frequency components except a DC component. When the second parameter value is 1, the correction unit 140 outputs any conversion coefficient without correction.

As mentioned above, the image processing device 100 according to the example embodiment includes a configuration that executes correction of a threshold-processed conversion coefficient depending on a feature quantity of a block. With this configuration, the image processing device 100 may further change a conversion coefficient that has been changed by threshold processing. Accordingly, the image processing device 100 is capable of further suppressing noise that is possibly generated due to threshold processing, compared with a case where this configuration is not included.

Second Example Embodiment

Figure 3:
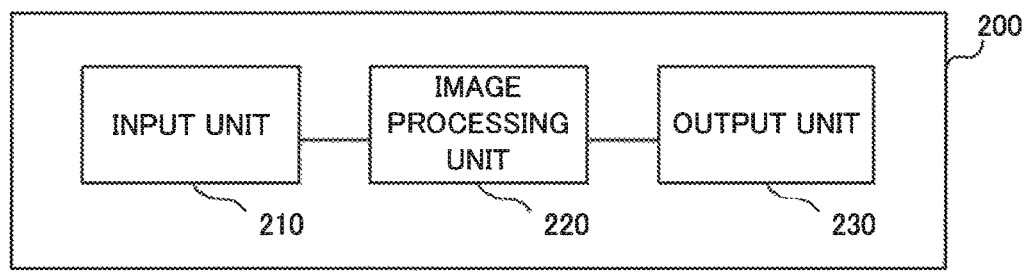
FIG. 3 is a block diagram illustrating another example configuration of the image processing device.

FIG. 3 is a block diagram illustrating a configuration of an image processing device 200 according to another example embodiment. The image processing device 200 includes an input unit 210, an image processing unit 220, and an output unit 230. Note that, in the example embodiment or an example embodiment mentioned later, the same term as that described in the first example embodiment is used in a similar meaning as in the first example embodiment, unless otherwise defined or described.

The input unit 210 inputs image data to the image processing unit 220. The input unit 210 is, for example, an imaging device such as a digital still camera or an image scanner or the like, or a database where image data is accumulated. Alternatively, the input unit 210 may be an interface for obtaining image data from such an imaging device or database. Note that the input unit 210 may execute processing to convert image data to a format suitable for image processing by the image processing unit 220, for example color space conversion, before inputting the image data to the image processing unit 220.

For the purpose of explanation, in the following description, image data input to the image processing unit 220 by the input unit 210 is also called "original image data". In other words, original image data is image data that have not undergone image processing by the image processing unit 220. Similarly, an image that has not undergone image processing by the image processing unit 220 is also called an "original image". A size or the number of pixels, or a color depth of original image data is not particularly limited as long as image processing is executable by the image processing unit 220.

The image processing unit 220 executes image processing including frequency conversion and its inverse conversion on the image data input by the input unit 210. Frequency conversion illustrated in the example embodiment is the RDCT. Further, image processing executed by the image processing unit 220 includes processing to suppress noise that is possibly generated due to the RDCT. The image processing unit 220 may consist of particular hardware or may be embodied by a combination of general-purpose hardware and particular software.

The output unit 230 outputs image data that have undergone image processing by the image processing unit 220. For example, the output unit 230 may be a device to visualize image data including a display or a printer, or a device to record image data on a storage medium including a hard disk or a memory card. Alternatively, the output unit 230 may be an interface to supply image data to a device mentioned above.

Figure 4:
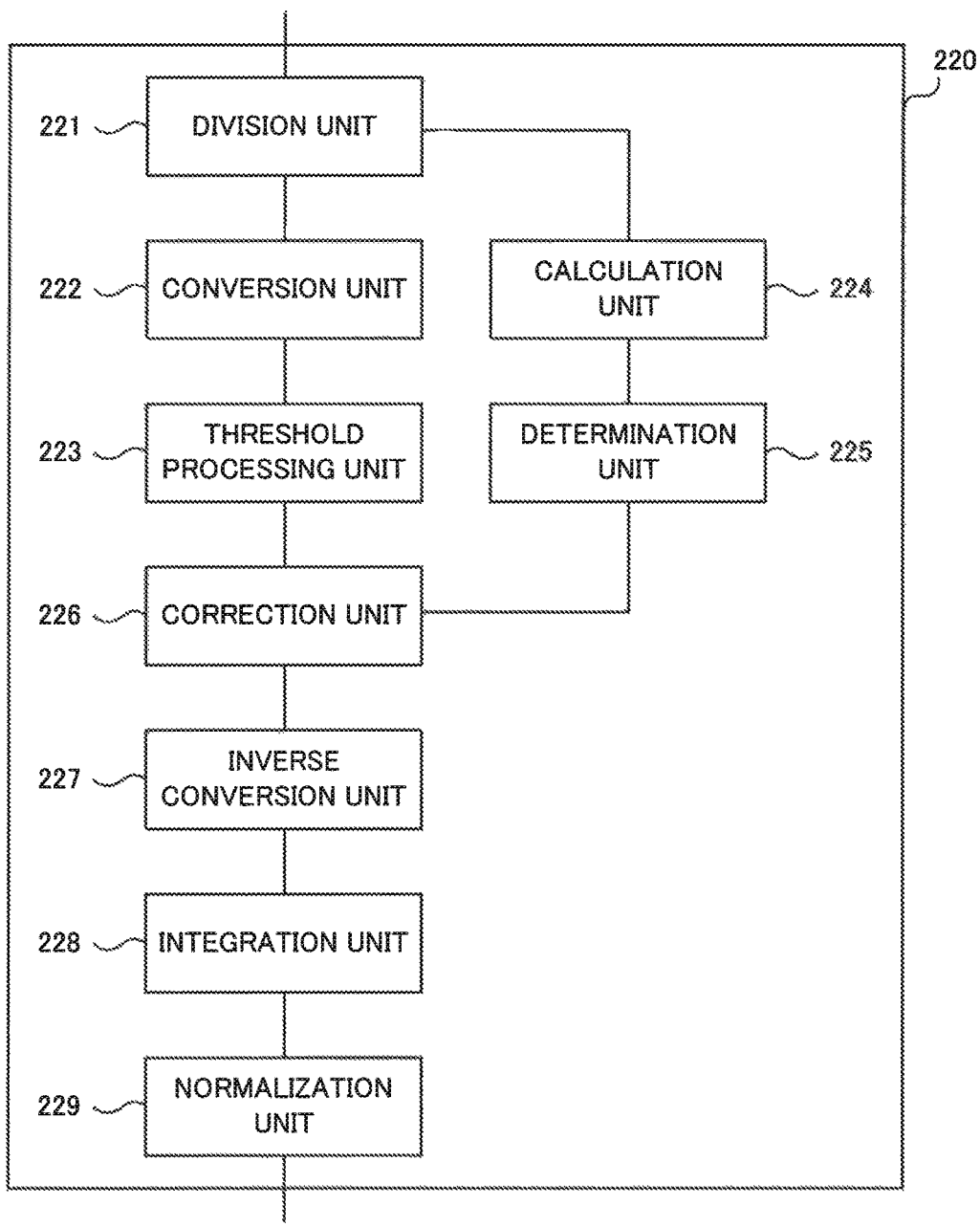
FIG. 4 is a functional block diagram illustrating an example configuration of an image processing unit.

FIG. 4 is a functional block diagram illustrating a configuration of the image processing unit 220. The image processing unit 220 includes a division unit 221, a conversion unit 222, a threshold processing unit 223, a calculation unit 224, a determination unit 225, a correction unit 226, an inverse conversion unit 227, an integration unit 228, and a normalization unit 229. The image processing unit 220 is a specific example of the image processing device 100 according to the first example embodiment.

Note that FIG. 4 illustrates a functional classification of components of the image processing unit 220. Thus, a component illustrated in FIG. 4 need not be a piece of hardware independent from each other but a plurality of components may be embodied, for example, by a single piece of hardware.

The division unit 221 divides image data into a plurality of blocks. It is assumed that the block size in the example embodiment is 8×8 pixels, namely 64 pixels. Division of image data by the division unit 221 permits overlap of blocks. In other words, a plurality of blocks obtained through vision by the division unit 221 may contain a same pixel.

FIG. 5 illustrates division of image data by the division unit 221. In FIG. 5, $P_{ij}$ represents a pixel in the i-th row and j-th column. In the example, a pixel $P_{12}$ is contained in a block B1 or B2. Similarly, a pixel $P_{21}$ is contained in a block B1 or B3. A pixel $P_{22}$ is contained in any one of the blocks B1, B2, B3 and B4.

In the following description, the number of blocks containing a pixel constituting original image data is called redundancy of the pixel. In the example embodiment where a block size is 8×8 pixels, redundancy of a pixel is a minimum of 1 and a maximum of 64. In the example of FIG. 5, redundancy of a pixel $P_{11}$ is 1. Redundancy of the pixel $P_{12}$ or $P_{21}$ is 2. Redundancy of the pixel $P_{22}$ is 4.

The conversion unit 222 executes the DCT on each of the blocks obtained through division by the division unit 221. The conversion unit 222 calculates a conversion coefficient of a frequency component obtained when a block is represented by a frequency domain, which coefficient is hereinafter referred to as a DCT coefficient. The DCT is executed by using a known technique.

The threshold processing unit 223 executes threshold processing on a per block basis. The threshold processing unit 223 executes threshold processing by using a predetermined parameter, hereinafter referred to as a "threshold parameter", on the conversion coefficient calculated by the conversion unit 222. The threshold processing is Hard Shrinkage in the example embodiment. The threshold parameter is an example of the first parameter.

Assuming that a DCT coefficient in a position (i,j) before threshold processing is f(i,j) and the threshold parameter is t, a threshold-processed DCT coefficient f'(i,j) may be represented by equation 1 given below. The position (i,j) represents a frequency component in horizontal and vertical directions. The larger the value of i or j is, the higher frequency component is represented. A DCT component in a position (i,j)=(0,0) is a DCT coefficient of a DC component.

$$f'(i, j) = \begin{cases} f(i, j) & |f(i, j)| > \tau \text{ or } (i, j) = (0, 0) \\ 0 & \text{otherwise} \end{cases} \quad (1)$$

As illustrated in equation 1, when the absolute value of a DCT coefficient is larger than the threshold parameter τ, the threshold processing unit 223 leaves the DCT coefficient unchanged. When the absolute value of a DCT coefficient is equal to or smaller than the threshold parameter τ, the threshold processing unit 223 changes the DCT coefficient to 0. Note that the DCT coefficient in a position (i,j)=(0,0) does not undergo threshold processing.

A specific value of the threshold parameter τ is not limited to a particular value. In the first example embodiment, the threshold parameter τ uses, for example, a same value for all blocks rather than depending on the distribution of pixels constituting a block. For example, assuming that a variance and a standard deviation of additive white Gaussian noise are $\sigma^2$ and σ respectively, the threshold parameter τ is a value satisfying 2σ≤t≤3σ. Alternatively, the threshold parameter τ may be determined based on the distribution of pixels constituting a block, that is, on a per block basis.

The calculation unit 224 calculates a feature quantity of each of the blocks obtained through division by the division unit 221. In the example embodiment, the calculation unit 224 calculates, as a feature quantity, a variance of pixel values of pixels constituting a block. Specifically, the calculation unit 224 calculates a mean value μ of the pixel values via equation 2 given below and calculates a variance $\sigma_c^2$ via equation 3 given below. Note that b(x,y) represents the pixel value of a pixel in the position (x,y). n represents a length of one side of a block (8 in the example embodiment).

$$\mu = \frac{1}{n^2} \sum_{x=1}^{n} \sum_{y=1}^{n} b(x, y) \quad (2)$$

$$\sigma_c^2 = \frac{1}{n^2} \sum_{x=1}^{n} \sum_{y=1}^{n} b(x, y)^2 - \mu^2 \quad (3)$$

When a block is in a flat region of an original image and variations in pixel value between pixels is exclusively caused by a variance of noise, assuming that a variance of noise contained in the original image is $\sigma^2$, $\sigma_c^2$ is almost equal to $\sigma^2$. On the other hand, when a block is in a texture region of an original image, that is, in a region where a particular pattern is repeated, or on an edge, $\sigma_c^2$ is sufficiently larger than $\sigma^2$. Thus, it is possible to use a variance $\sigma_c^2$ for assumption as to whether a block is in a flat region.

The determination unit 225 determines a predetermined parameter, hereinafter referred to as a "correction parameter", based on the feature quantity calculated by the calculation unit 224. In more detail, the determination unit 225 calculates a correction parameter γ via equation 4 given below by using the variance $\sigma_c^2$ calculated via equation 3 and a predetermined threshold ξ. The correction parameter γ is an example of the second parameter.

$$\gamma = \begin{cases} 0 & \sigma_c < \xi \\ 1 & \text{otherwise} \end{cases} \quad (4)$$

where ξ is represented by a product of a standard deviation σ of noise contained in an original image and a predetermined coefficient α. Note that the coefficient α is practically almost equal to 1.0. Comparing a standard deviation $\sigma_c$ and a threshold ξ is equivalent to assuming that a variance of pixel values in a block is equivalent to a variance of noise contained in an original image, that is, assuming that the block is a flat region.

The correction unit 226 corrects the DCT component of the frequency component threshold-processed by the threshold processing unit 223, by using the correction parameter determined by the determination unit 225. Specifically, the correction unit 226 calculates a corrected DCT coefficient f"(i,j) via equation 5 given below.

$$f''(i, j) = \begin{cases} f'(i, j) & (i, j) = (0, 0) \\ \gamma \times f'(i, j) & \text{otherwise} \end{cases} \quad (5)$$

As understood from equation 4, the correction parameter γ in the example embodiment is 0 or 1. Thus, the correction unit 226 outputs the DCT coefficients of all frequency components except a DC component, unchanged or uncorrected, or sets to 0 the DCT coefficients, depending on whether a standard deviation $\sigma_c$ is smaller than a threshold ξ. The correction unit 226 executes this processing on a per block basis.

The inverse conversion unit 227 executes inverse conversion of the frequency converted by the conversion unit 222, that is, the Inverse DCT (IDCT), by using the DCT coefficient corrected by the correction unit 226. In other words, the inverse conversion unit 227 generates corrected blocks corresponding to the blocks obtained through division by the division unit 221, by using the DCT coefficient corrected by the correction unit 226. The IDCT is executed by using a known technique, in a similar way to the DCT.

The integration unit 228 integrates the corrected blocks generated by the inverse conversion unit 227 and generates image data. The term integration used herein refers to processing to add up the pixel values of a pixel in a same position calculated on a per block basis. For example, in order to integrate a pixel $P_{22}$ having redundancy of 4 in the example of FIG. 5, the integration unit 228 adds up the pixel values of the pixel $P_{22}$ calculated based on each of the four blocks B1, B2, B3 and B4. Image data generated by this integration processing has the same number of pixels as the original image data.

The normalization unit 229 normalizes the image data generated by the integration unit 228. The term normalization used herein refers to processing to divide by redundancy the pixel value of each pixel obtained by addition repeated as many times as the redundancy. In other words, a combination of integration processing and normalization processing is processing to calculate a mean value of the pixel values calculated on a per block basis. For example, in order to integrate a pixel $P_{22}$ having redundancy of 4 in the example of FIG. 5, the normalization unit 229 divides by 4 the pixel value obtained by addition for four blocks by the integration unit 228.

Figure 6:
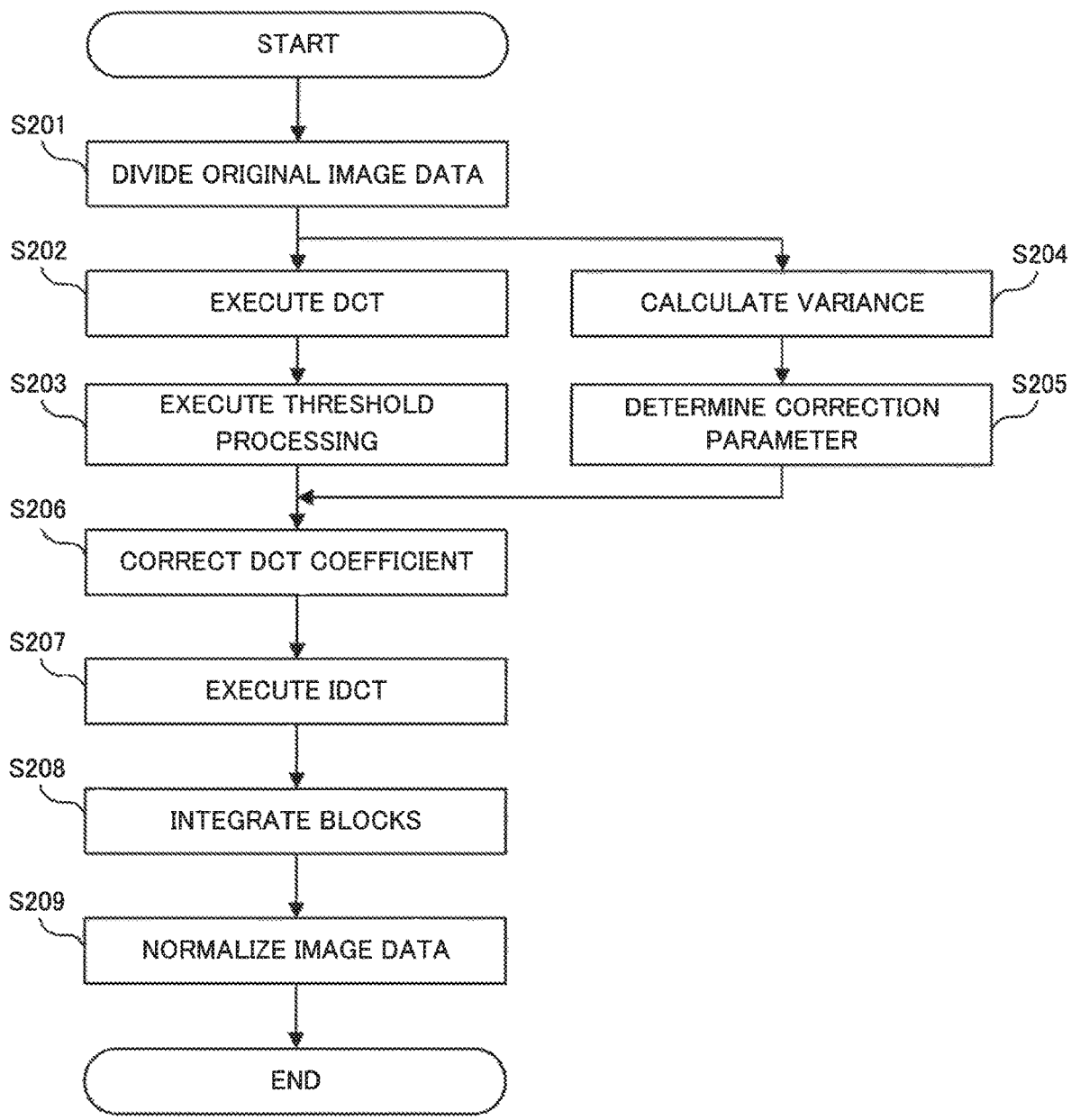
FIG. 6 is a flowchart illustrating an example operation of the image processing unit.

FIG. 6 is a flowchart illustrating an operation of the image processing unit 220. The image processing unit 220 executes the processing illustrated in FIG. 6, upon receiving input of original image data from the input unit 210. Note that, in FIG. 6, processing of steps S202 through S203 and processing of steps S204 through S205 may be executed in parallel. The image processing unit 220 may first execute the processing of steps S202 through S203 or the processing of steps S204 through S205 in a sequential execution.

In step S201, the division unit 221 divides original image data into a plurality of blocks. In step S202, the conversion unit 222 executes the DCT on a per block basis. In step S203, the threshold processing unit 223 executes threshold processing to reject some of the DCT coefficients calculated via the DCT.

In step S204, the calculation unit 224 calculates a feature quantity, that is, a variance $\sigma_c^2$ on a per block basis. In step S205, the determination unit 225 determines a correction parameter, based on the feature quantity calculated in step S204. The determination unit 225 determines the correction parameter on a per block basis.

In step S206, the correction unit 226 executes processing that is based on the execution results of steps S203 and S205. Specifically, the correction unit 226 corrects a DCT coefficient threshold-processed in step S203, by using the correction parameter determined in step S205. The correction unit 226 executes the correction processing on a per block basis.

In step S207, the inverse conversion unit 227 executes the IDCT by using the DCT coefficient corrected in step S206. The inverse conversion unit 227 thus generates corrected blocks corresponding to the DCT coefficient. In step S208, the integration unit 228 generates image data by integrating the blocks generated in step S207.

In step S209, the normalization unit 229 normalizes a pixel in the image data generated in step S208 depending on the redundancy of the pixel. Having executed normalization of all pixels, the normalization unit 229 supplies the corrected image data to the output unit 230.

As mentioned above, the image processing device 200 according to the example embodiment is capable of further changing the DCT component changed via threshold processing in a similar way to the image processing device 100 according to the first example embodiment. It is thus possible to suppress generation of noise due to some of the frequency components remaining in a particular block.

The image processing device 200 may execute correction in such a way that, when a feature quantity of pixels constituting a block satisfies a predetermined condition, the conversion coefficient corresponding to the block will be rejected. This correction solves the aforementioned problem, that is, the problem that some of the frequency components in a particular block remain without turning to 0, thereby suppressing generation of noise due to the frequency components.

As an example, assuming that the threshold parameter $\tau$ is $2\sigma$ in the example embodiment, the (theoretical) number of pixels within the range of $\pm 2\sigma$ of a mean value accounts for 95.45% of the total number as understood from the nature of standard normal distribution. When threshold processing is executed on a block, in theory, 2.87 (63×(1.0−0.9545)) DCT coefficients out of a total of 63 DCT coefficients of all frequency components except a DC component may remain without being converted. Frequency components, in particular high-frequency components whose DCT coefficients remain may be a cause of base pattern noise in a flat region.

Even when a DCT coefficient is not rejected by the threshold processing unit 223, that is, even when the absolute value of a DCT coefficient is larger than the threshold parameter $\tau$, the image processing device 200 sets to 0 the DCT coefficients of all frequency components except a DC component as long as the standard deviation $\sigma_c$ of pixel values in a block is smaller than the threshold $\xi$. In other words, the image processing device 200 rejects the DCT coefficients of all frequency components except a DC component when the assumption holds that a block is a flat region. Thus, the image processing device 200 may cancel, for example, a high-frequency component of noise that remains in a flat region when threshold processing alone has taken place.

Accordingly, the image processing device 200 is capable of removing the cause of noise in the flat region on a per block basis. The image processing device 200 is thus capable of removing a block containing such noise from an image, unlike a case without the configuration of the example embodiment, in particular, a case where the calculation unit 224, determination unit 225 or correction unit 226 is not included.

Third Example Embodiment

Figure 7:
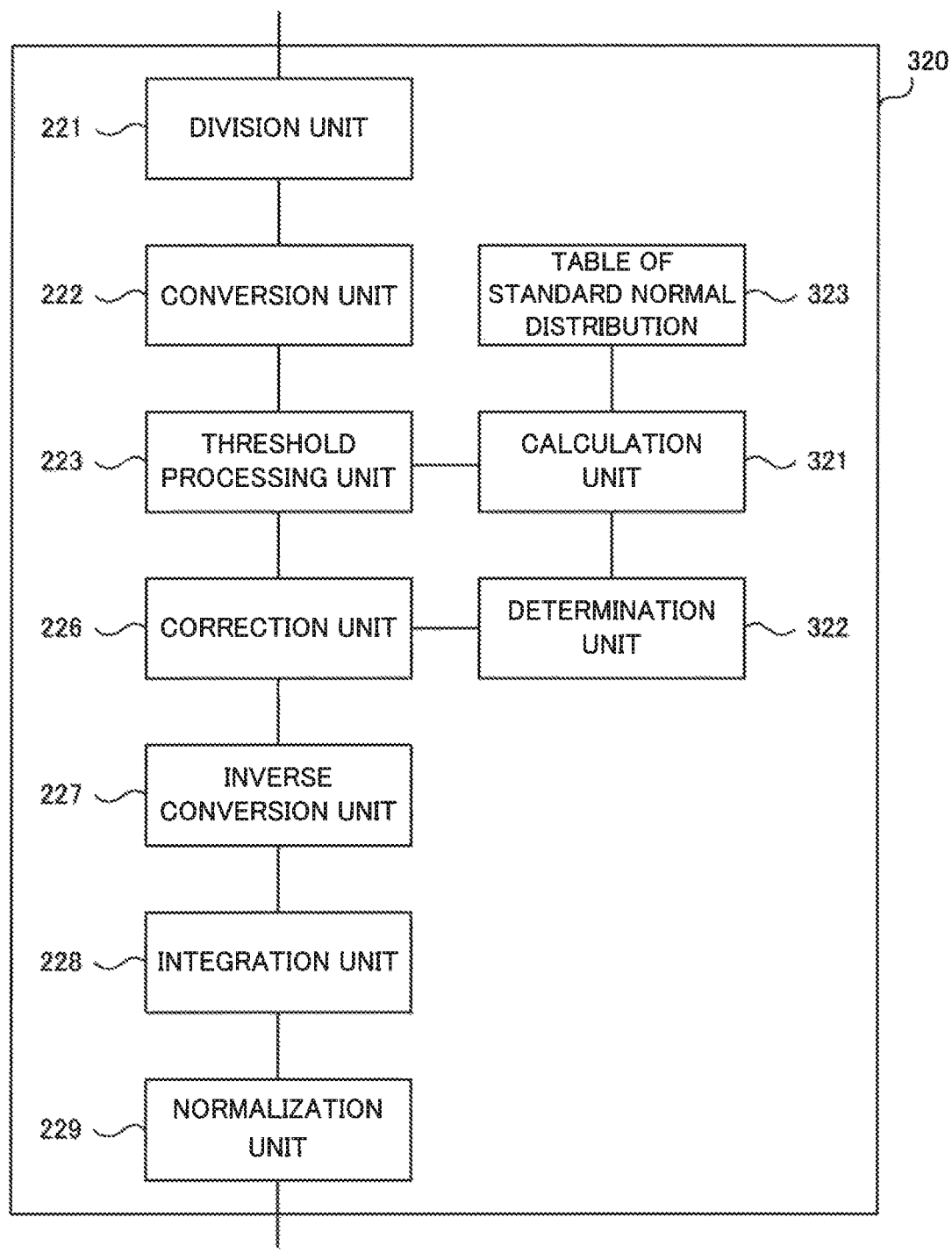
FIG. 7 is a functional block diagram illustrating another example configuration of the image processing unit.

FIG. 7 is a functional block diagram illustrating a configuration of an image processing unit 320 according to another example embodiment. The configuration of the example embodiment is similar to that of an image processing device 200 except in that the image processing unit 220 according to the second example embodiment is replaced with the image processing unit 320. In the example embodiment or an example embodiment mentioned later, a component indicated with the same reference sign as the second example embodiment includes a similar configuration or function to the second example embodiment. Description overlapping an aforementioned example embodiment is omitted as appropriate.

The image processing unit 320 includes a division unit 221, a conversion unit 222, a threshold processing unit 223, a correction unit 226, an inverse conversion unit 227, an integration unit 228 and a normalization unit 229 as well as a calculation unit 321 and a determination unit 322.

In other words, the image processing unit 320 differs from the image processing unit 220 in that the image processing unit 320 includes the calculation unit 321 and the determination unit 322 instead of a calculation unit 224 and a determination unit 225.

The calculation unit 321 calculates the number of non-zero elements on a per block basis. The number of non-zero elements refers to a total number of DCT coefficients except 0 that have been threshold-processed by the threshold processing unit 223. The calculation unit 321 calculates the number of non-zero elements by referencing the DCT coefficients threshold-processed by the threshold processing unit 223 and counting DCT coefficients having a value 0, or DCT coefficient having a value except 0. The number of non-zero elements is an example of a feature quantity.

The calculation unit 321 further compares the number of non-zero elements with its predictive value. In the first example embodiment, a predictive value of the number of non-zero elements is uniquely specified depending on a threshold parameter. For example, the calculation unit 321 may calculate a predictive value of the number of non-zero elements as follows.

The calculation unit 321 calculates a parameter z via equation 6 given below, based on a threshold parameter τ and a standard deviation σ of noise. The calculation unit 321 calculates a probability p that a DCT coefficient exists within the range of ±z in a standard normal distribution, by referencing a table of standard normal distribution 323.

$$z = \frac{\tau}{\sigma} \quad (6)$$

Figure 8B:
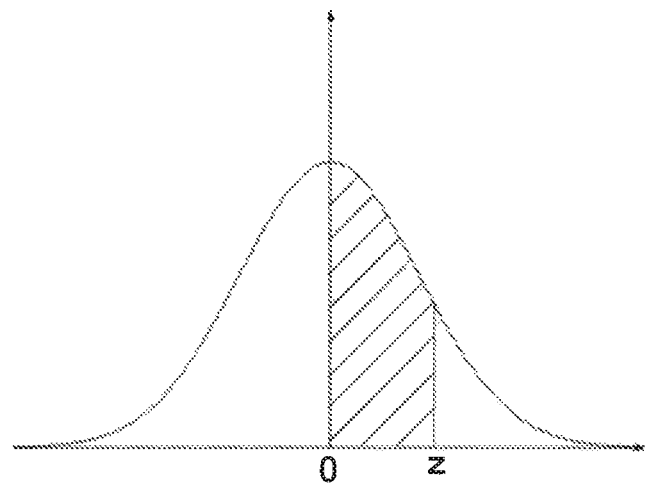
FIG. 8B illustrates a relationship between the table of standard normal distribution and a standard normal distribution.

FIG. 8A illustrates the table of standard normal distribution 323. FIG. 8B illustrates standard normal distribution. The table of standard normal distribution 323 lists, in percentage, a ratio of a hatched area to an area of a portion surrounded by the standard normal distribution curve and a horizontal axis in the standard normal distribution graph illustrated in FIG. 8B.

For example, when the threshold parameter τ is 2σ, the parameter z is 2.0. In this case, the probability p is 0.9544 because the ratio of the area assumed when z=2.00 is 0.4772. The calculation unit 321 is capable of calculating the probability p in a similar procedure even when the parameter z has a different value.

Once the probability p is calculated, the calculation unit 321 calculates a predictive value $NNZ_p$ of the number of non-zero elements via equation 7 given below. The function round(x) rounds a decimal part of x to the nearest integer. β is an appropriate preset parameter. n is a length of one side of a block or the number of pixels in the block and is equal to 8 in the example.

$$NNZ_p = \text{round}((n^2-1) \times (1-p)) + \beta \quad (7)$$

Note that the calculation unit 321 may calculate a predictive value by referencing data that are different from the table of standard normal distribution 323 illustrated in FIG. 8A. The table of standard normal distribution 323 may include more numerical values than those illustrated in FIG. 8A, that is, numerical values satisfying z≥2.1, or may have a different number of digits or accuracy of the decimal part.

Further, a predictive value may be uniquely specified from a threshold parameter, and accordingly the calculation unit 321 may specify a predictive value without executing the aforementioned calculation. For example, when a threshold parameter is a fixed value, a predictive value is also a fixed value. In such a case, the image processing unit 320 need not use data appearing in the table of standard normal distribution 323.

The determination unit 322 determines a correction parameter, based on the feature quantity or the number of non-zero elements calculated by the calculation unit 321. In more detail, the determination unit 322, assuming that the number of non-zero elements is NNZ and its predictive value is $NNZ_p$, calculates a correction parameter γ via equation 8 given below. The correction parameter γ is an example of a second parameter.

$$\gamma = \begin{cases} 0 & NNZ < NNZ_p \\ 1 & \text{otherwise} \end{cases} \quad (8)$$

The correction unit 226 corrects a DCT coefficient by using the correction parameter determined by the determination unit 322. As illustrated in equations 4 and 8, a correction parameter is calculated by using a separate calculation method in the example embodiment and the second example embodiment although either calculation method is used in a similar way in the correction unit 226. In other words, the correction unit 226 calculates a corrected DCT coefficient f"(i,j) by using, in equation 5, the correction parameter γ determined via equation 7.

Figure 9:
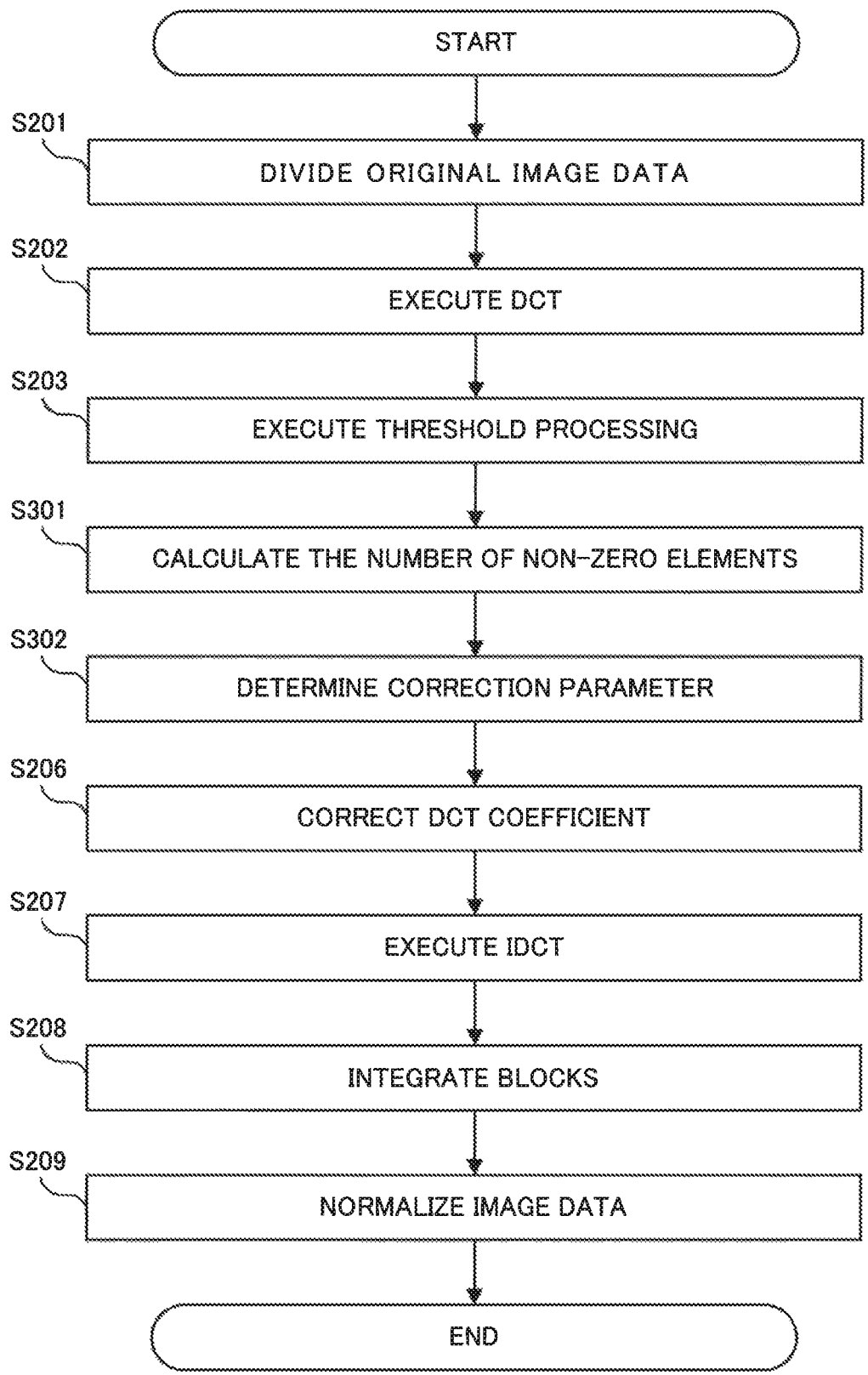
FIG. 9 is a flowchart illustrating another example operation of the image processing unit.

FIG. 9 is a flowchart illustrating an operation of the image processing unit 320. The image processing unit 320 executes similar processing to the image processing unit 220 according to the second example embodiment (see FIG. 6) except processing in steps S301 or S302. Note that the operation of the image processing unit 320 differs from that of the image processing unit 220 in that the operation of the image processing unit 320 does not include the processing in step S204 or S205. A step indicated with the same reference sign as FIG. 6 is a step to execute similar processing to that described in the second example embodiment.

In step S301, the calculation unit 321 calculates the number of non-zero elements, based on the DCT coefficient threshold-processed in step S203. In step S302, the determination unit 322 determines the correction parameter, based on the number of non-zero elements calculated in step S301. In step S206, the correction unit 226 corrects the DCT coefficient threshold-processed in step S203, by using the correction parameter determined in step S302.

As mentioned above, the image processing unit 320 according to the example embodiment is capable of further changing the DCT coefficient changed via threshold processing in a similar way to the image processing device 220 according to the second example embodiment. It is thus possible to suppress generation of noise due some of the frequency components remaining in a particular block.

In the example embodiment, comparing the number of non-zero elements NNZ in a block with the predictive value $NNZ_p$ is equivalent to assuming that the block is a flat region. When the number of non-zero elements NNZ in a block is smaller than the predictive value $NNZ_p$, the image processing unit 320 assumes that the block is a flat region and corrects to 0 the DCT coefficients of all frequency components except a DC component. The correction method according to the example embodiment uses different criteria for assuming that a block is a flat region, from the second example embodiment, and accordingly a result different from that of the second example embodiment is obtained.

In the correction method according to the second example embodiment, when the standard deviation of pixel values in a block is small, the DCT coefficients of all frequency components except a DC component are corrected to 0. Accordingly, in this correction method, even in a non-flat region where an edge or a texture is represented by high-frequency components, the DCT coefficients of all frequency components except a DC component may be corrected to 0 as long as the standard deviation of pixel values is small. On the other hand, the correction method according to the example embodiment may maintain a DCT coefficient in such a non-flat region, as long as the number of non-zero elements is larger than a predictive value, which approach prevents information on an edge or a texture of the region from being lost.

Fourth Example Embodiment

Figure 10:
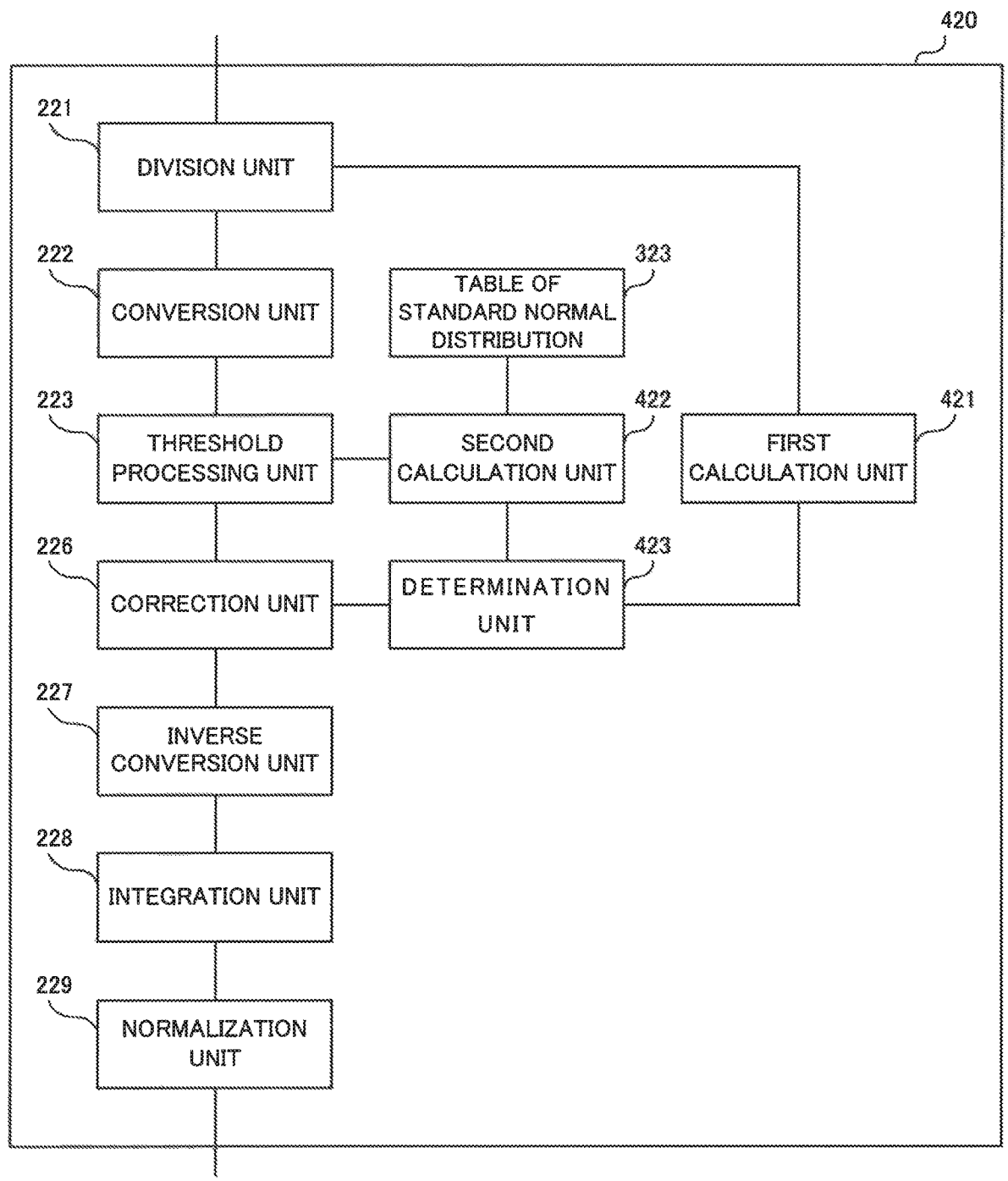
FIG. 10 is a functional block diagram illustrating another example configuration of the image processing unit.

FIG. 10 is a functional block diagram illustrating a configuration of an image processing unit 420 according to another example embodiment. The configuration of the example embodiment is similar to that of an image processing device 200 except in that the image processing unit 220 according to the second example embodiment is replaced with the image processing unit 420.

The image processing unit 420 includes a division unit 221, a conversion unit 222, a threshold processing unit 223, a correction unit 226, an inverse conversion unit 227, an integration unit 228 and a normalization unit 229 as well as a first calculation unit 421, a second calculation unit 422 and a determination unit 423. In other words, the image processing unit 420 differs from the image processing unit 220 in that the image processing unit 420 includes the first calculation unit 421, the second calculation unit 422 and the determination unit 423 instead of a calculation unit 224 and a determination unit 225.

The first calculation unit 421 operates in a similar way to the calculation unit 224 according to the second example embodiment. In other words, the first calculation unit 421 calculates a variance of pixel values of pixels constituting each of the blocks obtained through division by the division unit 221.

The second calculation unit 422 operates in a similar way to the calculation unit 321 according to the third example embodiment. In other words, the second calculation unit 422 calculates the number of non-zero elements on a per block basis and compares the each number of non-zero elements with its predictive value. The second calculation unit 422 may calculate a predictive value by referencing a table of standard normal distribution 323, or otherwise specify a predictive value.

In the example embodiment, a variance of pixel values calculated by the first calculation unit 421 and the number of non-zero elements calculated by the second calculation unit 422 are both examples of a feature quantity. In other words, two types of feature quantity are used in the example embodiment. The determination unit 423 determines a correction parameter as follows, based on these feature quantities. For the purpose of explanation, in the following description, the variance of pixel values calculated by the first calculation unit 421 is also called a "first feature quantity" and the number of non-zero elements calculated by the second calculation unit 422 is also called a "second feature quantity".

The determination unit 423 calculates a first flag $\varphi_1$ via equation 9 given below by using the variance $\sigma_c^2$ calculated via equation 3 and a threshold $\xi$. As understood from comparison with equation 4, the first flag $\varphi_1$ has a similar value to the correction parameter $\gamma$ according to the second example embodiment.

$$\phi_1 = \begin{cases} 0 & \sigma_c < \xi \\ 1 & \text{otherwise} \end{cases} \quad (9)$$

The determination unit 423, assuming that the number of non-zero elements is NNZ and its predictive value is $NNZ_p$, calculates a second flag $\varphi_2$ via equation 10 given below. As understood from comparison with equation 8, the second flag $\varphi_2$ has a similar value to the correction parameter $\gamma$ according to the third example embodiment.

$$\phi_2 = \begin{cases} 0 & NNZ < NNZ_p \\ 1 & \text{otherwise} \end{cases} \quad (10)$$

Once the first flag $\varphi_1$ and the second flag $\varphi_2$ are calculated, the determination unit 423 calculates a correction parameter $\gamma$ via equation 11 given below. The correction parameter $\gamma$ is an example of a second parameter. The determination unit 423 supplies the correction parameter $\gamma$ to the correction unit 226.

$$\gamma = \begin{cases} 1 & \phi_1 = 1 \\ 1 & \phi_1 = 0 \text{ and } \phi_2 = 1 \\ 0 & \phi_1 = 0 \text{ and } \phi_2 = 0 \end{cases} \quad (11)$$

Figure 11:
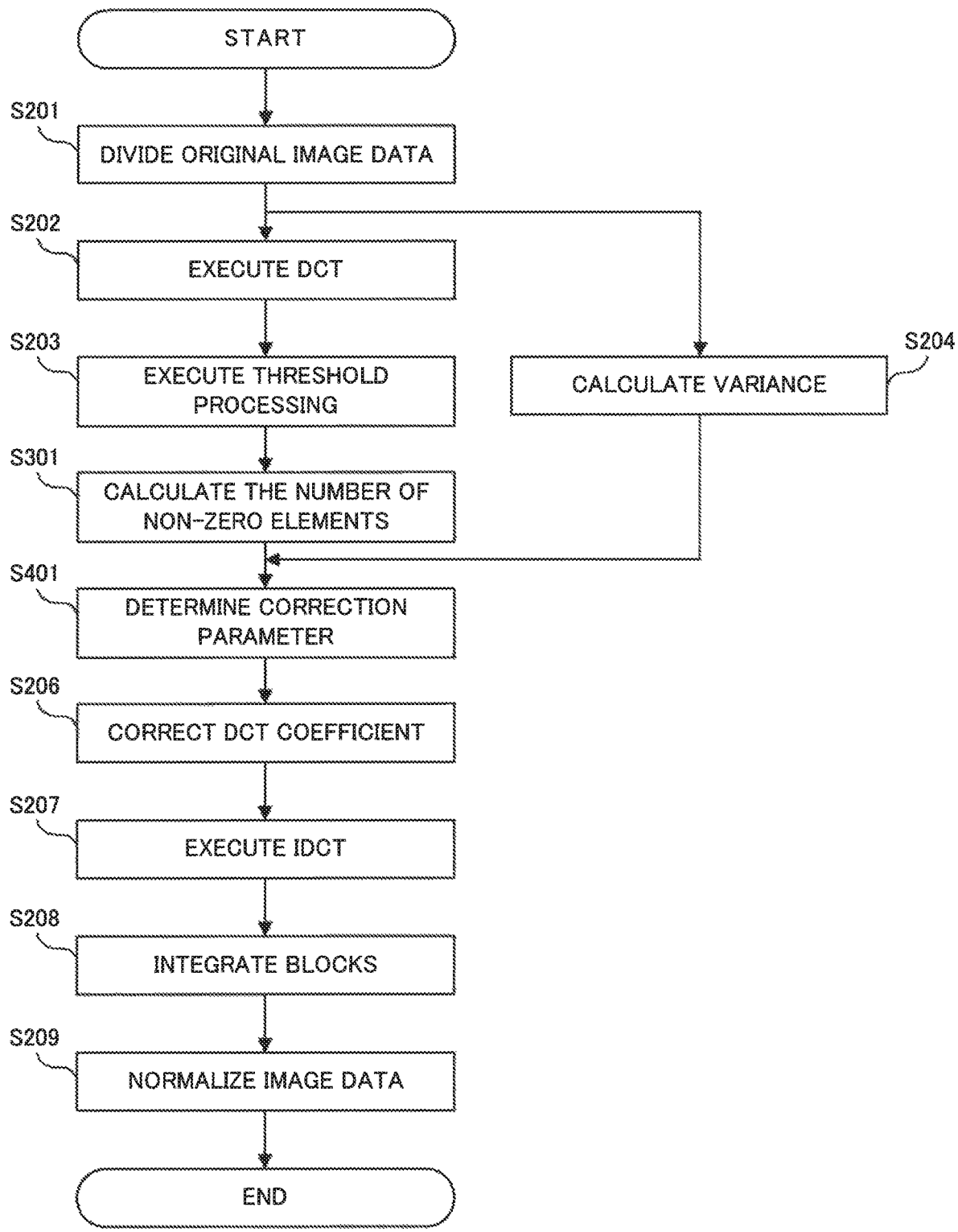
FIG. 11 is a flowchart illustrating another example operation of the image processing unit.

FIG. 11 is a flowchart illustrating an operation of the image processing unit 420. The image processing unit 420 executes similar processing to the image processing unit 220 according to the second example embodiment (see FIG. 6) except processing in step S301 and S401. Note that the operation of the image processing unit 420 differs from that of the image processing unit 220 in that the operation of the image processing unit 420 does not include the processing in step S205. A step indicated with the same reference sign as FIG. 6 or FIG. 9 is a step to execute similar processing to that described in the second or third example embodiment.

In step S401, the determination unit 423 determines the correction parameter, based on the variance calculated in step S204 and the number of non-zero elements calculated in step S301. Specifically, the determination unit 423 determines the correction parameter $\gamma$ on a per block basis by executing calculation via equation 9 through equation 11.

As mentioned above, the image processing unit 420 according to the example embodiment is capable of further changing the DCT component changed via threshold processing in a similar way to the image processing device 220 according to the second example embodiment. It is thus possible to suppress generation of noise due to some of the frequency components remaining in a particular block. The image processing unit 420 produces an effect of a combination of the correction method according to the second example embodiment and the correction method according to the third example embodiment.

Variations

The disclosure is not limited to the first through fourth example embodiments described above. The disclosure may include an example embodiment to which a variation or an application a person skilled in the art is able to understand from an aforementioned example embodiment.

For example, the disclosure includes variations described below. The disclosure may include an example embodiment including an appropriate combination of matters described in the description. For example, a matter described by using a particular example embodiment may be applied to another example embodiment without being contradictory.

(Variation 1)

A second parameter is not limited to two values, 0 and 1. The second parameter may take a value between 0 and 1. For example, the correction parameter $\gamma$ according to the second example embodiment may be calculated via equation 12 or equation 13 given below instead of equation 4. In equation 12 or equation 13, $\xi_{low}$, $\xi_{mid}$ and $\xi_{high}$ are predetermined thresholds satisfying $\xi_{low} < \xi_{mid} < \xi_{high}$. r is a predetermined parameter. The pow(x,y) function calculates the y-th power of x. In these examples, a correction parameter $\gamma$ changes gradually within the range of $\xi_{low} < \sigma_c < \xi_{high}$.

$$\gamma = \begin{cases} 0 & \sigma_c < \xi_{low} \\ 1 & \sigma_c > \xi_{high} \\ \dfrac{\sigma_c - \xi_{low}}{\xi_{high} - \xi_{low}} & \text{otherwise} \end{cases} \quad (12)$$

$$\gamma = \begin{cases} 0 & \sigma_c < \xi_{low} \\ 1 & \sigma_c > \xi_{high} \\ 0.5 \times pow\left(\dfrac{\sigma_c - \xi_{low}}{\xi_{mid} - \xi_{low}}, r\right) & \xi_{low} \leq \sigma_c < \xi_{mid} \\ 0.5 \times pow\left(-\dfrac{\xi_{high} - \sigma_c}{\xi_{high} - \xi_{mid}}, r\right) + 1.0 & \xi_{mid} \leq \sigma_c \leq \xi_{high} \end{cases} \quad (13)$$

(Variation 2)

A specific hardware configuration of an image processing device according to the disclosure may include a variety of variations and is not limited to a specific configuration. For example, the image processing device according to the disclosure may be embodied by software or by a plurality of hardware pieces that share various types of processing.

Figure 12:
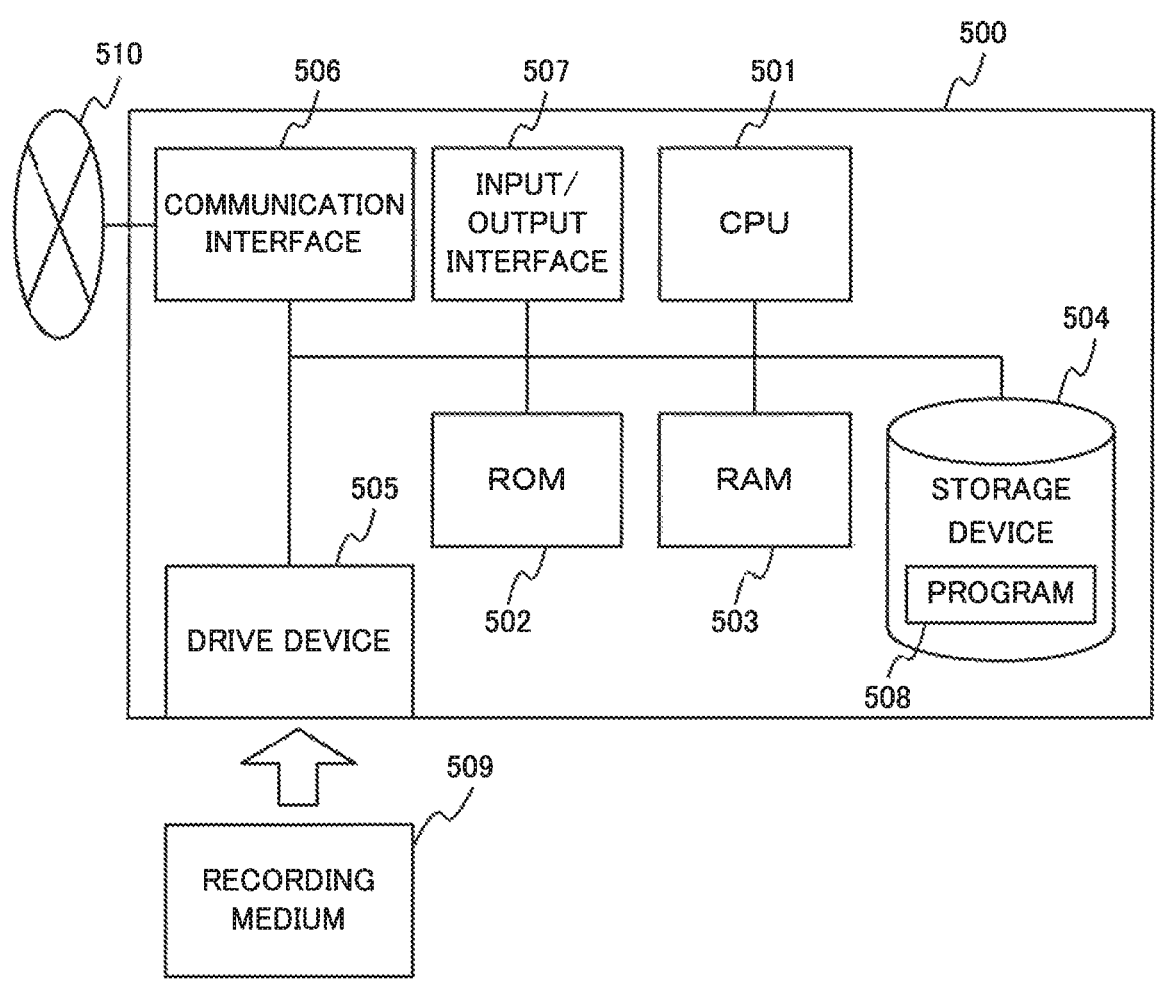
FIG. 12 is a block diagram illustrating an example hardware configuration of a computer device embodying the image processing device.

FIG. 12 is a block diagram illustrating an example hardware configuration of a computer device 500 embodying the image processing device according to the disclosure. The computer device 500 includes a Central Processing Unit (CPU) 501, a Read Only Memory (ROM) 502, a Random Access Memory (RAM) 503, a storage device 504, a drive device 505, a communication interface 506, and an input/output interface 507. The image processing device according to the disclosure may be embodied by the configuration or a part of the configuration illustrated in FIG. 12.

The CPU 501 executes a program 508 by using the RAM 503. The program 508 may be stored on the ROM 502. The program 508 may be recorded on a recording medium 509 such as a memory card and read by the drive device 505, or transmitted from an external device via a network 510. The communication interface 506 transmits/receives data to/from an external device via the network 510. The input/output interface 507 transmits/receives data to/from a peripheral device such as an input device or a display device. The communication interface 506 and the input/output interface 507 may function as a means for acquiring or outputting data.

A component of the image processing device according to the disclosure may consist of a single circuit such as a processor or a combination of a plurality of circuits. The term circuit used herein may refer to either a general-purpose or special-purpose circuit.

A configuration described as a single device in an aforementioned example embodiment may be distributed to a plurality of devices. For example, the image processing device 100 or 200 may be embodied by a plurality of computer devices by using the cloud computing technology or the like.

The present application claims priority, based on Japanese Patent Application No. 2016-046550, filed on Mar. 10, 2016, the entire disclosure of which is incorporated herein.

REFERENCE SIGN LIST 100, 200 Image processing device
220, 320, 420 Image processing unit
210 Input unit
230 Output unit
221 Division unit
222 Conversion unit
110, 223 Threshold processing unit
120, 224, 321 Calculation unit
130, 225, 322, 423 Determination unit
140, 226 Correction unit
227 Inverse conversion unit
228 Integration unit
229 Normalization unit
421 First calculation unit
422 Second calculation unit

What is claimed is:

1. An image processing device comprising:
at least a memory storing instructions; and
at lease a processor configured to execute the instructions for:
executing threshold processing, by using a first parameter, on a conversion coefficient of a frequency component that is obtained by frequency conversion of a block consisting of a plurality of pixels;
calculating a feature quantity of the plurality of pixels constituting the block;
determining a second parameter, based on the calculated feature quantity;
correcting, by using the determined second parameter, the threshold-processed conversion coefficient of the frequency component;
calculating a total number of threshold-processed conversion coefficients except zero for the plurality of pixels in the block; and
when the total number of threshold-processed conversion coefficients except zero is less than a threshold number, making the threshold-processed conversion coefficients to be zero.

2. The image processing device according to claim 1, wherein
the feature quantity includes a feature quantity regarding distribution of the plurality of pixels.

3. The image processing device according to claim 2, wherein
the feature quantity includes a variance or a standard deviation of pixel values of the plurality of pixels.

4. The image processing device according to claim 1, wherein
the at lease a processor corrects the threshold-processed conversion coefficient of the frequency component that satisfies a predetermined condition such that the threshold-processed conversion coefficient becomes zero.

5. An image processing method comprising:
executing threshold processing, by using a first parameter, on a conversion coefficient of a frequency component that is obtained by frequency conversion of a block consisting of a plurality of pixels;
calculating a feature quantity of the plurality of pixels constituting the block;
determining a second parameter, based on the calculated feature quantity;
correcting, by using the determined second parameter, the threshold-processed conversion coefficient of the frequency component;
calculating a total number of threshold-processed conversion coefficients except zero for the plurality of pixels in the block; and
when the total number of threshold-processed conversion coefficients except zero is less than a threshold number, making the threshold-processed conversion coefficients to be zero.

6. A non-transitory program recording medium storing, in a computer-readable way, a program for executing processing on a computer, the processing comprising:

processing to execute threshold processing, by using a first parameter, on a conversion coefficient of a frequency component that is obtained by frequency conversion of a block consisting of a plurality of pixels;

processing to calculate a feature quantity of the plurality of pixels constituting the block;

processing to determine a second parameter, based on the calculated feature quantity;

processing to correct, by using the determined second parameter, the threshold-processed conversion coefficient of the frequency component;

processing to calculate a total number of threshold-processed conversion coefficients except zero for the plurality of pixels in the block; and processing to, when the total number of threshold-processed conversion coefficients except zero is less than a threshold number, make the threshold-processed conversion coefficients to be zero.

* * * * *